United States Patent
Fu et al.

(10) Patent No.: US 9,720,237 B1
(45) Date of Patent: Aug. 1, 2017

(54) MIXED ENVIRONMENT DISPLAY DEVICE AND WAVEGUIDE CROSS-COUPLING SUPPRESSORS

(71) Applicants: Yijing Fu, Redmond, WA (US); Angus Wu, Bellevue, WA (US); Gangok Lee, Bellevue, WA (US); Mingwei Hsu, Lynnwood, WA (US)

(72) Inventors: Yijing Fu, Redmond, WA (US); Angus Wu, Bellevue, WA (US); Gangok Lee, Bellevue, WA (US); Mingwei Hsu, Lynnwood, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 15/008,422

(22) Filed: Jan. 27, 2016

(51) Int. Cl.
| | |
|---|---|
| *G02B 6/26* | (2006.01) |
| *G02B 27/01* | (2006.01) |
| *G02B 6/02* | (2006.01) |
| *G02B 5/30* | (2006.01) |
| *G02B 1/11* | (2015.01) |
| *G02B 5/20* | (2006.01) |

(52) U.S. Cl.
CPC ............ *G02B 27/0172* (2013.01); *G02B 1/11* (2013.01); *G02B 5/20* (2013.01); *G02B 5/3083* (2013.01); *G02B 6/02052* (2013.01); *G02B 2027/0112* (2013.01); *G02B 2027/0118* (2013.01)

(58) Field of Classification Search
None
See application file for complete search history.

(56) References Cited

U.S. PATENT DOCUMENTS

| | | | |
|---|---|---|---|
| 6,171,885 B1 | 1/2001 | Fan et al. | |
| 6,273,571 B1 | 8/2001 | Sharp et al. | |
| 6,310,673 B1 | 10/2001 | Sharp | |
| 6,801,272 B2 | 10/2004 | Fuenfschilling et al. | |

(Continued)

FOREIGN PATENT DOCUMENTS

| | | |
|---|---|---|
| CN | 203275784 | 11/2013 |
| EP | 2887128 A1 | 6/2015 |

OTHER PUBLICATIONS

Aharon, et al., "Design of Wide Band Tunable Birefringent Filters with Liquid Crystals", In Proceedings of Progress in Electromagnetics Research Symposium, vol. 5, No. 6, Aug. 2009, pp. 555-560.

(Continued)

*Primary Examiner* — Sung Pak
(74) *Attorney, Agent, or Firm* — Newport IP, LLC; Scott Y. Shigeta

(57) ABSTRACT

An optical device comprises a number of waveguides, e.g., color plates, that are individually formed to couple a corresponding color output of a micro-display engine and project an image into a human vision system. Some configurations include stacked structures for suppressing a predetermined wavelength range a corresponding to a wavelength range emitted from a waveguide. Techniques, devices, and systems disclosed herein can mitigate cross coupling that occurs between the waveguides to provide enhanced MTF values over devices that do not include the stacked structures. Individual optical devices configured to suppress a predetermined wavelength range are also provided.

46 Claims, 4 Drawing Sheets

(56) References Cited

U.S. PATENT DOCUMENTS

| | | | |
|---|---|---|---|
| 7,106,509 B2 | 9/2006 | Sharp | |
| 7,336,323 B2 | 2/2008 | Wang | |
| 7,379,123 B2 | 5/2008 | Willis | |
| 7,646,398 B2 | 1/2010 | Brown Elliott | |
| 7,843,638 B2 * | 11/2010 | Watanabe | G02B 6/0026 359/15 |
| 8,164,721 B2 | 4/2012 | Tan et al. | |
| 8,189,263 B1 | 5/2012 | Wang et al. | |
| 8,687,275 B2 | 4/2014 | Coleman et al. | |
| 2006/0291021 A1 * | 12/2006 | Mukawa | G02B 5/32 359/15 |
| 2007/0070504 A1 * | 3/2007 | Akutsu | G02B 5/1861 359/573 |
| 2007/0070859 A1 * | 3/2007 | Hirayama | G02B 5/32 369/112.04 |
| 2008/0151371 A1 | 6/2008 | Weber et al. | |
| 2009/0161383 A1 * | 6/2009 | Meir | G02B 6/0041 362/551 |
| 2014/0043688 A1 | 2/2014 | Schrader | |
| 2016/0161801 A1 * | 6/2016 | Watano | G02B 5/201 349/71 |

OTHER PUBLICATIONS

Dimova, et al., "Highly Efficient Broadband Polarization Retarders and Tunable Polarization Filters made of Composite Stacks of Ordinary Wave Plates", In Journal of Optical Society of America A, vol. 31, Issue 5, May 2014, pp. 1-6.

"International Search Report and Written Opinion Issued in PCT Application No. PCT/US2017/013624", dated Mar. 30, 2017, 12 Pages.

* cited by examiner

US 9,720,237 B1

MIXED ENVIRONMENT DISPLAY DEVICE AND WAVEGUIDE CROSS-COUPLING SUPPRESSORS

BACKGROUND

Some devices include waveguides for providing near-to-eye display capabilities. For example, a head mounted display ("HMD") can include a number of waveguides to provide a single-eye display or a dual-eye display to a user. Some devices are designed to provide a computer generated image ("CGI") to a user, while other devices are designed to provide a mixed environment display, which includes superimposing a CGI over a real-world view. Thus, a user can see a real-world view of objects in their surrounding environment along with a CGI, a feature that is sometimes referred to as an "augmented reality display" because a user's view of the world can be augmented with a CGI. Although such devices are becoming more commonplace, developments to improve the sharpness of displayed images will continue to be a priority.

The disclosure made herein is presented with respect to these and other considerations. It is with respect to these and other considerations that the disclosure made herein is presented.

SUMMARY

Technologies described herein provide an enhanced mixed environment display device and waveguide cross-coupling suppressors. In some configurations, a device comprises a number of waveguides, e.g., color plates, that are individually formed to couple a corresponding color output of a micro-display engine and project an image into a human vision system. Some configurations include stacked structures for suppressing a predetermined wavelength range corresponding to a wavelength range emitted from a waveguide. Techniques, devices, and systems disclosed herein can mitigate cross coupling that occurs between the waveguides to provide enhanced modulation transfer function (MTF) values over devices that do not include the stacked structures.

It should be appreciated that the above-described subject matter may also be implemented as part of a computer-controlled apparatus, a computing system, part of an article of manufacture, or a process for making the same. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
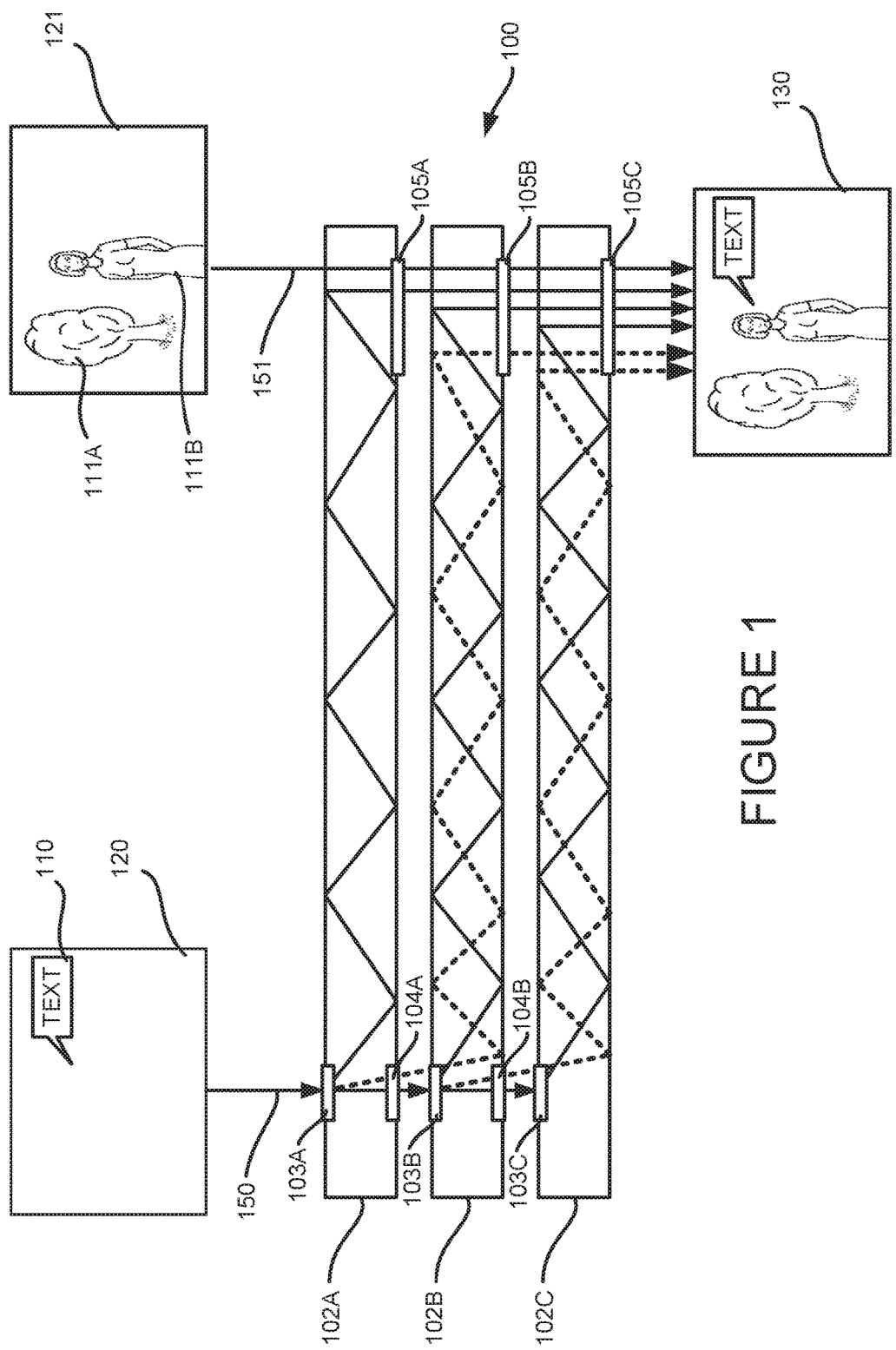
FIG. 1 illustrates an example optical device including a number of waveguides.

With reference to FIG. 1, an optical device 100 includes a first waveguide 102A, a second waveguide 102B, and a third waveguide 102C, which are individually and collectively referred to herein as a "waveguide 102" or a "grating structure 102." In some configurations, the first waveguide 102A includes a first input region 103A for receiving input light 150 into the first waveguide 102A and a first output region 105A for emitting a first output light from the first waveguide 102A. The first waveguide 102A is formed to reflect a first predetermined wavelength range of the input light within the first waveguide 102A towards the first output region 105A. The first waveguide 102A also comprises a first pass-through region 104A for emitting the input light 150.

The second waveguide 102B has a second input region 103B for receiving the input light 150 into the second waveguide 102B from the first pass-through region 104A. The second waveguide 102B has a second output region 105B for emitting a second output light. The second waveguide 102B is formed to reflect a second predetermined wavelength range of the input light 150 within the second waveguide 102B towards the second output region 105B. The second waveguide 102B also has a second pass-through region 104B for emitting the input light 150.

The third waveguide 102C has a third input region 103C for receiving the input light 150 into the third waveguide 102C from the second pass-through region 104B. The third waveguide 102C has a third output region 105C for emitting a third output light. The third waveguide 102C is formed to reflect a third predetermined wavelength range of the input light 150 within the third waveguide 102C towards the third output region 105C.

The input regions 103 of each waveguide 102 can include coupling mirror structures that are orientated to reflect the input light 150 through the pass-through regions 104. The coupling mirror structures can also reflect a select wavelength range of the input light 150 towards the output region 105. It can be appreciated that each waveguide 102 can also have other coupling mirror structures for achieving the results described herein, including a coupling mirror structure opposite of the output region 105.

The first predetermined wavelength range, second predetermined wavelength range, and the third predetermined wavelength range can individually include a first range including 460 nm (blue), a second range including 525 nm (green), or a third range including 617 nm (red). It can be appreciated that the ranges can be in any order. For example, the order of the waveguides configured for each wavelength range can be: RGB, GBR, BRG, RBG, GRB, BGR, etc.

The optical device 100 is configured to enable a user to simultaneously view objects from different environments. In some configurations, the optical device 100 can display a CGI 120, e.g., a rendering of an object 110. The CGI 120 can be emitted into the optical device 100 by the use of a micro-display engine or other like device. In addition, some configurations of the optical device 100 can allow a user to see through sections of the optical device 100, enabling the user to view real-world objects in his or her surrounding environment. In the example of FIG. 1, light 151 from a sample real-world view 121 includes a view of a first real-world object 111A and a second real-world object 111B, which are collectively and individually referred to herein as "real-world objects 111." For illustrative purposes, a user's perspective looking at real-world objects 111 through the optical device 100 is referred to herein as a "real-world view of a real-world object" or a "real-world view of a physical object." The optical device 100 aligns the output light of the output regions 105 to enable an output view 130, where the CGI 120 is superimposed over the real-world view 121. For illustrative purposes, the output view 130 is referred to as a "mixed environment" display.

Due to the fact that the grating diffraction efficiency spectrum of each color plate 102 can be wide, light can couple into the wrong color plate even at a crossed polarization angle. For a number of reasons, including the existence of substrate wedge angle variation and grating dispersion, the output angle of a single color light from the wrong color plate can be different from the single color light from the correct color plate. This phenomenon leads to a spread out in the angular space for the output light, which in turn leads to a number of issues, including a MTF drop for one or more colors. A graphical representation of such issues is shown with the dashed lines in FIG. 1. As shown by the dashed lines, light of a first color can emit from the first plate 102A of the first color into the second plate 102B of a second color. Similarly, light of the second color can emit from the second plate 102B to a third plate 102C of a third color. Techniques and configurations, such as the optical device 200 of FIG. 2, utilize stacked structures for suppressing the optical phenomenon described above.

Figure 2:
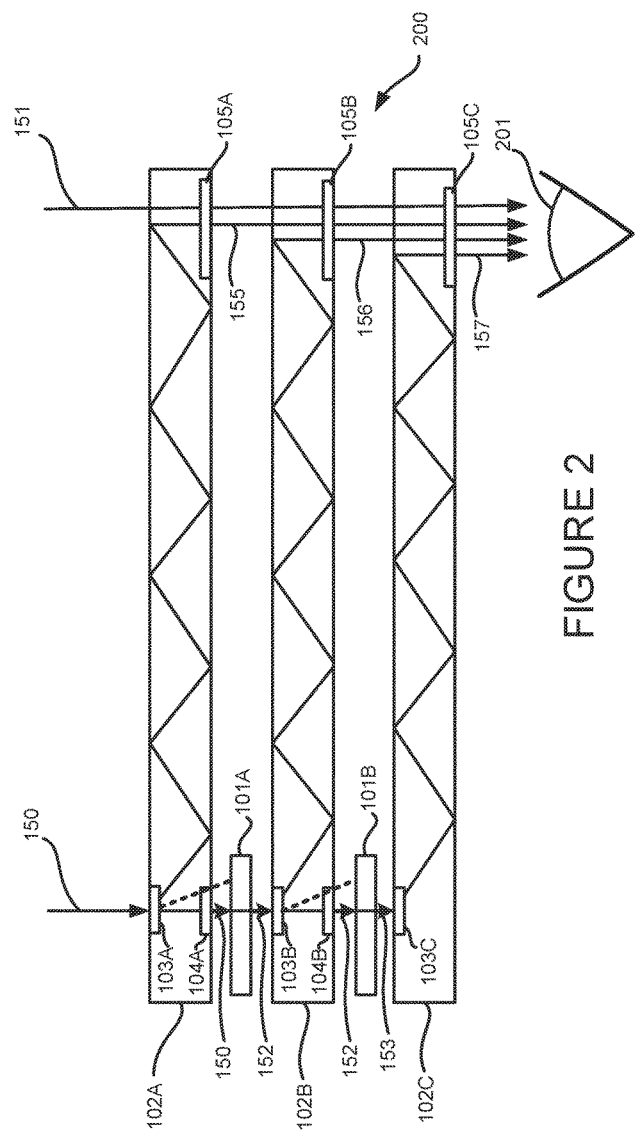
FIG. 2 illustrates an example optical device including a number of waveguides and a number of stacked structures for suppressing cross coupling between the waveguides.

With reference to FIG. 2, an optical device 200 includes a first waveguide 102A, a second waveguide 102B, and a third waveguide 102C. The optical device 200 also includes a first stacked structure 101A positioned between the first waveguide 102A and the second waveguide 102B, and a second stacked structure 101B positioned between the second waveguide 102B and the third waveguide 102C.

In some configurations, the first waveguide 102A includes a first input region 103A for receiving input light 150 into the first waveguide 102A and a first output region 105A for emitting a first output light 155 from the first waveguide 102A. The first waveguide is formed to reflect a first predetermined wavelength range of the input light within the first waveguide towards the first output region 105A causing the first output light 155. The first waveguide 102A also has a first pass-through region 104A for emitting the input light 150.

The first stacked structure 101A receives the input light 150 from the first pass-through region 104A. The first stacked structure 101A is configured to suppress the first predetermined wavelength range from the input light 150 to emit a first filtered light 152 having a suppressed level of light within the first predetermined wavelength range.

The second waveguide 102B has a second input region 103B for receiving the first filtered light 152 into the second waveguide 102B. The second waveguide 102B has a second output region 105B for emitting a second output light 156. The second waveguide 102B is formed to reflect a second predetermined wavelength range of the first filtered light 152 within the second waveguide 102B towards the second output region 105B causing the second output light 156. The second waveguide 102B also includes a second pass-through region 104B for emitting the first filtered light 152.

The second stacked structure 101B receives the first filtered light 152 from the first pass-through region 104A. The second stacked structure 101B is configured to suppress the second predetermined wavelength range from the first filtered light 152 to emit a second filtered light 153 having a suppressed level of light within the second predetermined wavelength range.

The third waveguide 102C has a third input region 103C for receiving the second filtered light 153 into the third waveguide 102C from the second pass-through region 104B. The third waveguide 102C has a third output region 105C for emitting a third output light 157. The third waveguide 102C is formed to reflect a third predetermined wavelength range of the second filtered light 153 within the third waveguide 102C towards the third output region 105C causing the third output light 157.

Similar to the optical device 100, the optical device 200 is configured to enable a user to simultaneously view objects from different environments. In some configurations, the optical device 200 can display a CGI 120. The CGI 120 can be emitted into the optical device 200 by the use of a micro-display engine or other like device. In addition, some configurations of the optical device 100 can allow a user to see through sections of the optical device 100, enabling the user to view real-world objects in his or her surrounding environment. The optical device 200 aligns the output light (155-157) of the output regions 105 and the light 151 from the surrounding environment to enable a mixed environment display.

As summarized above, the waveguides 102 serve the function to couple a particular color output from a display engine, such as a micro-display engine and project light into a human vision system 201. The stacked structures 101 can include a wide-band ½ plate between the waveguides 102 to convert the polarization state of the single color light to (1) the optimum in-coupling polarization angle at a corresponding waveguide and to (2) the crossed polarization angle at the wrong waveguide to reduce single color light coupling into the wrong color plate. Such a result, e.g., stacked structures 101 blocking a single color light from entering a wrong waveguide 102, is represented by the dashed lines. The resulting light has improved sharpness quality and a high MTF value.

Figure 3A:
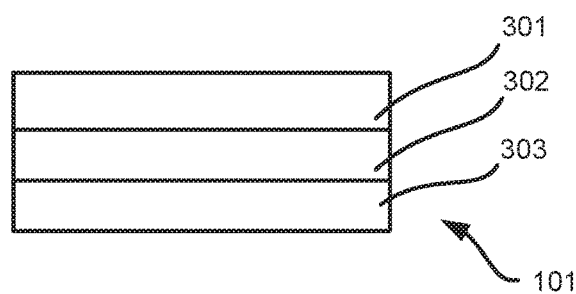
FIGS. 3A and 3B respectively illustrate a side view and a perspective view of a three-layer stacked structure that can be used for suppressing cross coupling between the waveguides.
Figure 3B:
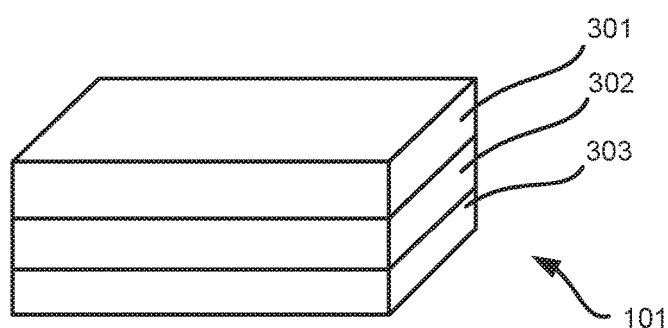

Referring now to FIGS. 3A and 3B, aspects of a stacked structure 101 are shown and described below. The stacked structure 101 shown in FIGS. 3A and 3B can be the first stacked structure 101A and/or the second stacked structure 101B. As shown, the stacked structure 101 can include an input pigmentation layer 301 for suppressing light within a predetermined wavelength range. The light can be suppressed by absorbing and reflecting light within a predetermined wavelength range.

Any material suitable for absorbing and/or reflecting light within a predetermined wavelength range can be utilized. For example, a synthetic dye or an organic dye can be used in the pigmentation layer 301. In some configurations, the pigmentation layer 301 can include any suitable dichromatic substance for absorbing and/or reflecting light within a predetermined wavelength range. Examples of dichromatic substances include some seed oils, bromophenol blue and resazurin. The predetermined wavelength range is dependent on both the concentration of the suppressing substance and the depth or thickness of the medium that is traversed.

In some configuration, the pigmentation layer 301 absorbs light and reflects light at the same time. In some configurations, the dye can be configured to suppress blue, green, or red light. For example, if the stacked structure 101 is to suppress a blue light, the pigmentation layer 301 can absorb light within the range of 450 nm and 470 nm. If the stacked structure 101 is to suppress a green light, the pigmentation layer 301 can absorb light within the range of 515 nm and 535 nm. If the stacked structure 101 is to suppress a red light, the pigmentation layer 301 can absorb light within the range of 607 nm and 627 nm.

The stacked structure 101 can also include an output antireflective film 303 and a retardation film 302 between the output antireflective film 303 and the input pigmentation layer 301. The retardation film 302 is configured to provide a predetermined retardation value. In some configurations, retardation film 302 is configured to provide a predetermined retardation value that includes 270 degrees or 90 degrees. For illustrative purposes, the retardation film 302 is also referred to as a polarization film. The designs disclosed herein can include a retardation value within a threshold of 270 degrees or within the threshold of 90 degrees. For example, the threshold can be one, two, or three degrees.

Figure 4A:
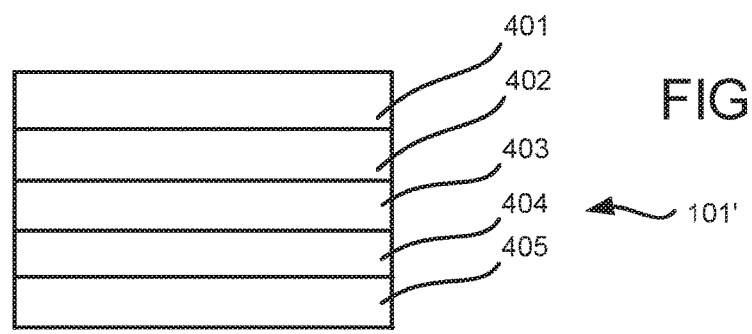
FIGS. 4A and 4B respectively illustrate a side view and a perspective view of a five-layer stacked structure that can be used for suppressing cross coupling between the waveguides.
Figure 4B:
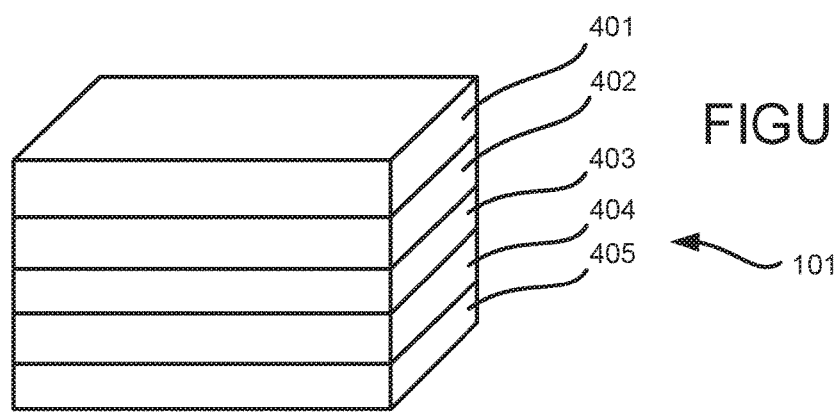

Referring now to FIGS. 4A and 4B, aspects of another configuration of a stacked structure 101' are shown and described below. The stacked structure 101' shown in FIGS. 4A and 4B can be the first stacked structure 101A and/or the second stacked structure 101B. As shown, the stacked structure 101' can include an input antireflective film 401. The stacked structure 101' can also include a first retardation film 402 adjacent to the antireflective film 401. The first retardation film 402 can be configured to provide a predetermined retardation value. In some configurations, first retardation film is 402 is configured to provide a predetermined retardation value that includes 45 degrees. The designs of the stacked structure 101' can include retardation film with a retardation value of 45 degrees, an equivalent of 45 degrees, or a value within a threshold of 45 degrees.

The stacked structure 101' also includes a bandpass filter layer 403 adjacent to the first retardation film is 402. The bandpass filter layer 403 substantially filters light at wavelengths below a first predetermined level and above a second predetermined level. For example, if the stacked structure 101' is to allow the passage of a blue light, the first predetermined level and the second predetermined level can be 450 and 470, respectively. If the stacked structure 101' is to allow the passage of a green light, the first predetermined level and the second predetermined level can be 515 and 535, respectively. If the stacked structure 101' is to allow the passage of a red light, the first predetermined level and the second predetermined level can be 607 and 627, respectively. Among other examples, the stacked structure 101' can be configured to allow the passage of a green light and a red light. In such a configuration, the first predetermined level and the second predetermined level can be 515 and 627, respectively. In yet another example, the stacked structure 101' can be configured to allow the passage of a blue light and a green light. In such a configuration, the first predetermined level and the second predetermined level can be 450 and 535, respectively.

In some configurations, the bandpass filter layer 403 can comprise a synthetic dye or an organic dye. It can be appreciated that any suitable material can be used to filter light at wavelengths below a first predetermined level and above a second predetermined level. In some configurations, the bandpass filter layer 403 can include any suitable dichromatic substance for filtering light at wavelengths below a first predetermined level and above a second predetermined level. Examples of dichromatic substances include some seed oils, bromophenol blue and resazurin.

In one illustrative example, with reference to FIG. 2, consider a design where the first waveguide 102A, second waveguide 102B, and third waveguide 102C respectively emit a blue light, a green light, and a red light. In such a configuration, the bandpass filter layer 403 of the first stacked structure 101A can filter light at wavelengths below 470 nm and filter light at wavelengths above 627 nm. These ranges are provided for illustrative purposes, any suitable values can be used to enable the first stacked structure 101A to substantially inhibit the passage of blue light, and allow the passage of green and red light. Other ranges for the bandpass filter layer 403 of the first stacked structure 101A can be used. For example, the bandpass filter layer 403 of the first stacked structure 101A can filter light at wavelengths below 515 nm and fitter light at wavelengths above 627 nm.

In the current example, the bandpass filter layer 403 of the second stacked structure 101B can filter light at wavelengths below 607 nm and filter light at wavelengths above 627 nm. Thus, the second stacked structure 101B in this example allows the passage of red light and inhibits the passage of green and blue light. These ranges are provided for illustrative purposes, any suitable values can be used to enable the second stacked structure 101B to substantially inhibit green and blue light and allow the passage of red light.

These examples are provided for illustrative purposes and is not to be construed as limiting. It can be appreciated that the waveguides 102 can be in any other suitable order, including RGB, RBG, BGR, BRG. In addition, the stacked structures 101 can be arranged to allow the passage of one or more colors, which may include colors associated with the waveguides 102 succeeding the stacked structures 101 in a light path. The bandpass filter layer 403 can be configured with different parameters depending on the desired result. For instance, if a target wavelength of a waveguide is 617 nm, the bandpass filter can allow the passage of light within a threshold, e.g., 1 nm to 10 nm, of the target wavelength. For example, the bandpass filter layer 403 can filter light at wavelengths below 524 nm and filter light at wavelengths above 526 nm when a succeeding waveguide is configured to emit green light. In another example, the bandpass filter layer 403 can filter light at wavelengths below 459 nm and filter light at wavelengths above 461 nm when a succeeding waveguide is configured to emit blue light. In yet another example, the bandpass filter layer 403 can filter light at wavelengths below 616 nm and filter light at wavelengths above 618 nm when a succeeding waveguide is configured to emit red light. Other ranges can be used with the configurations disclosed herein.

The stacked structure 101' also includes a second retardation film 404 adjacent to the bandpass filter layer 403. The second retardation film 404 can be configured to provide a predetermined retardation value. In some configurations, second retardation film 404 is configured to provide a predetermined retardation value that includes 45 degrees or an equivalent to 45 degrees. The second retardation film 404, and the other retardation layers disclosed herein, can be manufactured by diagonally stretch or machine directional stretch process. The stacked structure 101' also includes an output antireflective film 405 adjacent to the second retardation film 404. As with other antireflective films disclosed herein, the output antireflective film 405 can include coatings, such as broadband antireflection coatings, that can be applied using vacuum coating, wet coating, or any other suitable method. Antiglare coatings also may be applied in order to reduce unwanted specular reflection.

Based on the foregoing, it should be appreciated that concepts and technologies have been disclosed herein that provide formable interface and shielding structures. Although the subject matter presented herein has been described in language specific to some structural features, methodological and transformative acts, and specific machinery, it is to be understood that the invention defined in the appended claims is not necessarily limited to the specific features or acts described herein. Rather, the specific features and acts are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. An optical device, comprising:
   a first waveguide having a first input region for receiving input light into the first waveguide and a first output region for emitting a first output light from the first waveguide, the first waveguide reflecting a first predetermined wavelength range of the input light within the first waveguide towards the first output region, the first waveguide having a first pass-through region for emitting the input light;
   a first stacked structure for receiving the input light from the first pass-through region, the first stacked structure suppressing the first predetermined wavelength range from the input light to emit a first filtered light, wherein suppressing the first predetermined wavelength range includes absorbing and reflecting light within the first predetermined wavelength range;
   a second waveguide having a second input region for receiving the first filtered light into the second waveguide and a second output region for emitting a second output light from the second waveguide, the second waveguide reflecting a second predetermined wavelength range of the first filtered light within the second waveguide towards the second output region, the second waveguide having a second pass-through region for emitting the first filtered light;
   a second stacked structure for receiving the first filtered light from the second pass-through region, the second stacked structure configured suppressing the second predetermined wavelength range from the first filtered light to emit a second filtered light, wherein suppressing the second predetermined wavelength range includes absorbing and reflecting light within the second predetermined wavelength range; and
   a third waveguide having a third input region for receiving the second filtered light into the third waveguide and a third output region for emitting a third output light from the third waveguide, the third waveguide reflecting a third predetermined wavelength range of the second filtered light within the third waveguide towards the third output region.

2. The optical device of claim 1, wherein the first output region, second output region, the third output region, and a lens emitting light of a field-of-view are aligned to emit a combined output light that includes the first output light, second output light, the third output light, and the light of the field-of-view.

3. The optical device of claim 1, wherein the first predetermined wavelength range comprises a first range including 460 nm, a second range including 525 nm, or a third range including 617 nm.

4. The optical device of claim 1, wherein the second predetermined wavelength range comprises a first range including 460 nm, a second range including 525 nm, or a third range including 617 nm.

5. The optical device of claim 1, wherein the third predetermined wavelength range comprises a first range including 460 nm, a second range including 525 nm, or a third range including 617 nm.

6. The optical device of claim 1, wherein the first stacked structure comprises:
   an input pigmentation layer for absorbing light within the first predetermined wavelength range;
   an output antireflective film; and
   a retardation film between the output antireflective film and the input pigmentation layer, wherein the retardation film is configured to provide a predetermined retardation value.

7. The optical device of claim 6, wherein the predetermined retardation value is within a threshold level of 270 degrees or 90 degrees.

8. The optical device of claim 1, wherein the second stacked structure comprises:
   an input pigmentation layer for absorbing light within the second predetermined wavelength range;
   an output antireflective film; and
   a retardation film between the output antireflective film and the input pigmentation layer, wherein the retardation film is configured to provide a predetermined retardation value.

9. The optical device of claim 8, wherein the predetermined retardation value is within a threshold level of 270 degrees or 90 degrees.

10. An optical device, comprising:
    a first waveguide having a first input region for receiving input light into the first waveguide and a first output region for emitting a first output light from the first waveguide, the first waveguide reflecting a first predetermined wavelength range of the input light within the first waveguide towards the first output region, the first waveguide having a first pass-through region for emitting the input light;
    a first stacked structure for receiving the input light from the first pass-through region, the first stacked structure including a first bandpass filter layer substantially filtering light at wavelengths below a second predetermined wavelength and above a third predetermined wavelength to emit a first filtered light;
    a second waveguide having a second input region for receiving the first filtered light into the second waveguide and a second output region for emitting a second output light from the second waveguide, the second waveguide reflecting the second predetermined wavelength range of the first filtered light within the second waveguide towards the second output region, the second waveguide having a second pass-through region for emitting the first filtered light;
    a second stacked structure for receiving the first filtered light from the second pass-through region, the second stacked structure including a second bandpass filter layer substantially filtering light at wavelengths above and below the third predetermined wavelength range to emit a second filtered light; and a third waveguide having a third input region for receiving the second filtered light into the third waveguide and a third output region for emitting a third output light from the third waveguide, the third waveguide reflecting the third predetermined wavelength range of the second filtered light within the third waveguide towards the third output region.

11. The optical device of claim 10, wherein the first output region, second output region, the third output region, and a lens emitting light of a field-of-view are aligned to emit a combined output light that includes the first output light, second output light, the third output light, and the light of the field-of-view.

12. The optical device of claim 10, wherein the first predetermined wavelength range comprises a first range including 460 nm, a second range including 525 nm, or a third range including 617 nm.

13. The optical device of claim 10, wherein the second predetermined wavelength range comprises a first range including 460 nm, a second range including 525 nm, or a third range including 617 nm.

14. The optical device of claim 10, wherein the third predetermined wavelength range comprises a first range including 460 nm, a second range including 525 nm, or a third range including 617 nm.

15. The optical device of claim 10, wherein the first stacked structure comprises:
an input antireflective layer;
a first selective wavelength retardation film adjacent to the first antireflective layer, the wavelength retardation film providing a predetermined retardation value;
a second selective wavelength retardation film, the second selective wavelength retardation film providing the predetermined retardation value, the first bandpass filter layer positioned between the first selective wavelength retardation film and the second selective wavelength retardation film; and
an output antireflective film adjacent to the second selective wavelength retardation film.

16. The optical device of claim 15, the first bandpass filter layer substantially filtering light at wavelengths at least 10 nm above and at least 10 nm below the second predetermined wavelength.

17. The optical device of claim 15, wherein the predetermined retardation value is 45 degrees.

18. The optical device of claim 15, wherein the second stacked structure comprises:
an input antireflective layer;
a first selective wavelength retardation film adjacent to the first antireflective layer, the wavelength retardation film providing a predetermined retardation value;
a second selective wavelength retardation film, the second selective wavelength retardation film providing the predetermined retardation value, the second bandpass filter layer positioned between the first selective wavelength retardation film and the second selective wavelength retardation film; and
an output antireflective film adjacent to the second selective wavelength retardation film.

19. The optical device of claim 18, the second bandpass filter layer substantially filtering light at wavelengths at least 10 nm above and at least 10 nm below the third predetermined wavelength.

20. The optical device of claim 17, wherein the predetermined retardation value is 45 degrees.

21. An optical device, comprising:
a first waveguide having a first input region for receiving input light into the first waveguide and a first output region for emitting a first output light from the first waveguide, the first waveguide reflecting a first predetermined wavelength range of the input light within the first waveguide towards the first output region, the first waveguide having a first pass-through region for emitting the input light;
a first stacked structure for receiving the input light from the first pass-through region, the first stacked structure including a bandpass filter layer substantially filtering light at wavelengths below a second predetermined wavelength range and light at wavelengths above a third predetermined wavelength range to emit a first filtered light;
a second waveguide having a second input region for receiving the first filtered light into the second waveguide and a second output region for emitting a second output light from the second waveguide, the second waveguide reflecting the second predetermined wavelength range of the first filtered light within the second waveguide towards the second output region, the second waveguide having a second pass-through region for emitting the first filtered light;
a second stacked structure for receiving the first filtered light from the second pass-through region, the second stacked structure configured suppressing the second predetermined wavelength range from the first filtered light to emit a second filtered light; and
a third waveguide having a third input region for receiving the second filtered light into the third waveguide and a third output region for emitting a third output light from the third waveguide, the third waveguide reflecting the third predetermined wavelength range of the second filtered light within the third waveguide towards the third output region.

22. The optical device of claim 21, wherein the first stacked structure comprises:
an input antireflective layer;
a first selective wavelength retardation film adjacent to the first antireflective layer, the wavelength retardation film providing a predetermined retardation value;
a second selective wavelength retardation film, the second selective wavelength retardation film providing the predetermined retardation value, the bandpass filter layer positioned between the first selective wavelength retardation film and the second selective wavelength retardation film; and
an output antireflective film adjacent to the second selective wavelength retardation film.

23. The optical device of claim 22, the second bandpass filter layer substantially filtering light at wavelengths at least 10 nm above and at least 10 nm below the second predetermined wavelength.

24. The optical device of claim 22, wherein the predetermined retardation value is within a threshold of 45 degrees.

25. The optical device of claim 21, wherein the second stacked structure comprises:
an input pigmentation layer for absorbing light within the second predetermined wavelength range;
an output antireflective film; and
a retardation film between the output antireflective film and the input pigmentation layer, wherein the retardation film is configured to provide a predetermined retardation value.

26. The optical device of claim 25, wherein the predetermined retardation value is within a threshold level of 270 degrees or 90 degrees.

27. An optical device, comprising:
a first waveguide having a first input region for receiving input light into the first waveguide and a first output region for emitting a first output light from the first waveguide, the first waveguide reflecting a first predetermined wavelength range of the input light within the first waveguide towards the first output region, the first waveguide having a first pass-through region for emitting the input light;
a first stacked structure for receiving the input light from the first pass-through region, the first stacked structure suppressing the first predetermined wavelength range from the input light to emit a first filtered light;
a second waveguide having a second input region for receiving the first filtered light into the second waveguide and a second output region for emitting a second output light from the second waveguide, the second waveguide reflecting the second predetermined wavelength range of the first filtered light within the second waveguide towards the second output region, the second waveguide having a second pass-through region for emitting the first filtered light;
a second stacked structure for receiving the first filtered light from the second pass-through region, the second stacked structure including a second bandpass filter layer substantially filtering light at wavelengths above and below a third predetermined wavelength range to emit a second filtered light; and
a third waveguide having a third input region for receiving the second filtered light into the third waveguide and a third output region for emitting a third output light from the third waveguide, the third waveguide reflecting the third predetermined wavelength range of the second filtered light within the third waveguide towards the third output region.

28. The optical device of claim 27, wherein the first stacked structure comprises:
an input pigmentation layer for absorbing light within the first predetermined wavelength range;
an output antireflective film; and
a retardation film between the output antireflective film and the input pigmentation layer, wherein the retardation film is configured to provide a predetermined retardation value.

29. The optical device of claim 28, wherein the predetermined retardation value is 270 degrees or 90 degrees.

30. The optical device of claim 27, wherein the second stacked structure comprises:
an input antireflective layer;
a first selective wavelength retardation film adjacent to the first antireflective layer, the wavelength retardation film providing a predetermined retardation value;
a second selective wavelength retardation film, the second selective wavelength retardation film providing the predetermined retardation value, the second bandpass filter layer positioned between the first selective wavelength retardation film and the second selective wavelength retardation film; and
an output antireflective film adjacent to the second selective wavelength retardation film.

31. The optical device of claim 30, the second bandpass filter layer substantially filtering light at wavelengths at least 10 nm above and at least 10 nm below the third predetermined wavelength.

32. The optical device of claim 30, wherein the predetermined retardation value is 45 degrees.

33. An optical device, comprising:
a first waveguide having a first input region for receiving input light into the first waveguide and a first output region for emitting a first output light from the first waveguide, the first waveguide reflecting a first predetermined wavelength range of the input light within the first waveguide towards the first output region, the first waveguide having a first pass-through region for emitting the input light;
a stacked structure for receiving the input light from the first pass-through region, the stacked structure suppressing the first predetermined wavelength range from the input light to emit a filtered light, wherein suppressing the first predetermined wavelength range includes absorbing and reflecting light within the first predetermined wavelength range;
a second waveguide having a second input region for receiving the filtered light into the second waveguide and a second output region for emitting a second output light from the second waveguide, the second waveguide reflecting a second predetermined wavelength range of the filtered light within the second waveguide towards the second output region, the second waveguide having a second pass-through region for emitting the filtered light; and
a third waveguide having a third input region for receiving the filtered light into the third waveguide and a third output region for emitting a third output light from the third waveguide, the third waveguide reflecting a third predetermined wavelength range of the filtered light within the third waveguide towards the third output region.

34. The optical device of claim 33, wherein the first output region, second output region, the third output region, and a lens emitting light of a field-of-view are aligned to emit a combined output light that includes the first output light, second output light, the third output light, and the light of the field-of-view.

35. The optical device of claim 33, wherein the first predetermined wavelength range comprises a first range including 460 nm, a second range including 525 nm, or a third range including 617 nm.

36. The optical device of claim 33, wherein the second predetermined wavelength range comprises a first range including 460 nm, a second range including 525 nm, or a third range including 617 nm.

37. The optical device of claim 33, wherein the third predetermined wavelength range comprises a first range including 460 nm, a second range including 525 nm, or a third range including 617 nm.

38. The optical device of claim 33, wherein the stacked structure comprises:
an input pigmentation layer for absorbing light within the first predetermined wavelength range;
an output antireflective film; and
a retardation film between the output antireflective film and the input pigmentation layer, wherein the retardation film is configured to provide a predetermined retardation value.

39. The optical device of claim 38, wherein the predetermined retardation value is within a threshold level of 270 degrees or 90 degrees.

40. An optical device, comprising:
a first waveguide having a first input region for receiving input light into the first waveguide and a first output region for emitting a first output light from the first waveguide, the first waveguide reflecting a first predetermined wavelength range of the input light within the first waveguide towards the first output region, the first waveguide having a first pass-through region for emitting the input light;

a second waveguide having a second input region for receiving the input light into the second waveguide and a second output region for emitting a second output light from the second waveguide, the second waveguide reflecting a second predetermined wavelength range of the input light within the second waveguide towards the second output region, the second waveguide having a second pass-through region for emitting the input light;

a stacked structure for receiving the input light from the second pass-through region, the stacked structure configured suppressing the second predetermined wavelength range from the input light input light to emit a filtered light, wherein suppressing the second predetermined wavelength range includes absorbing and reflecting light within the second predetermined wavelength range; and a third waveguide having a third input region for receiving the filtered light into the third waveguide and a third output region for emitting a third output light from the third waveguide, the third waveguide reflecting a third predetermined wavelength range of the filtered light within the third waveguide towards the third output region.

41. The optical device of claim 40, wherein the first output region, second output region, the third output region, and a lens emitting light of a field-of-view are aligned to emit a combined output light that includes the first output light, second output light, the third output light, and the light of the field-of-view.

42. The optical device of claim 41, wherein the first predetermined wavelength range comprises a first range including 460 nm, a second range including 525 nm, or a third range including 617 nm.

43. The optical device of claim 41, wherein the second predetermined wavelength range comprises a first range including 460 nm, a second range including 525 nm, or a third range including 617 nm.

44. The optical device of claim 41, wherein the third predetermined wavelength range comprises a first range including 460 nm, a second range including 525 nm, or a third range including 617 nm.

45. The optical device of claim 41, wherein the stacked structure comprises:
   an input pigmentation layer for absorbing light within the second predetermined wavelength range;
   an output antireflective film; and
   a retardation film between the output antireflective film and the input pigmentation layer, wherein the retardation film is configured to provide a predetermined retardation value.

46. The optical device of claim 45, wherein the predetermined retardation value is within a threshold level of 270 degrees or 90 degrees.

* * * * *